United States Patent
Chen et al.

(10) Patent No.: US 8,888,872 B2
(45) Date of Patent: Nov. 18, 2014

(54) GASIFIER COOLING SYSTEM

(75) Inventors: Wei Chen, Houston, TX (US); Richard Anthony DePuy, Schenectady, NY (US); Judeth Brannon Corry, Houston, TX (US); Benjamin Campbell Steinhaus, Houston, TX (US)

(73) Assignee: General Electric Company, Schenectady, NY (US)

( * ) Notice: Subject to any disclaimer, the term of this patent is extended or adjusted under 35 U.S.C. 154(b) by 142 days.

(21) Appl. No.: 12/831,189

(22) Filed: Jul. 6, 2010

(65) Prior Publication Data

US 2012/0005959 A1    Jan. 12, 2012

(51) Int. Cl.
*B01J 7/00* (2006.01)
*C01B 3/36* (2006.01)
*C10J 3/74* (2006.01)
*C10J 3/76* (2006.01)
*C10J 3/86* (2006.01)
*C10K 3/04* (2006.01)

(52) U.S. Cl.
CPC ... *C01B 3/36* (2013.01); *C10J 3/74* (2013.01); *C10J 3/76* (2013.01); *C10J 3/86* (2013.01); *C01B 2203/0216* (2013.01); *C01B 2203/0255* (2013.01); *C01B 2203/0283* (2013.01); *C01B 2203/0485* (2013.01); *C01B 2203/049* (2013.01); *C01B 2203/061* (2013.01); *C01B 2203/068* (2013.01); *C01B 2203/0877* (2013.01); *C01B 2203/0883* (2013.01); *C01B 2203/0894* (2013.01); *C01B 2203/169* (2013.01); *C01B 2203/84* (2013.01); *C10K 3/04* (2013.01); *C10J 2300/0916* (2013.01); *C10J 2300/0959* (2013.01); *C10J 2300/1606* (2013.01); *C10J 2300/1618* (2013.01); *C10J 2300/1653* (2013.01); *C10J 2300/1656* (2013.01); *C10J 2300/1675* (2013.01); *C10J 2300/1678* (2013.01); *C10J 2300/1861* (2013.01); *C10J 2300/1892* (2013.01); *Y02E 20/18* (2013.01); *Y02E 20/16* (2013.01)
USPC .......................................................... 48/61

(58) Field of Classification Search
CPC ... C10J 1/00; C10J 2200/00; C10J 2300/1861
See application file for complete search history.

(56) References Cited

U.S. PATENT DOCUMENTS

| 328,007 A | 10/1885 | Coffin |
| 2,761,772 A | 9/1956 | Atwell |
| 2,961,310 A | 1/1957 | Steever |
| 2,871,114 A | 1/1959 | Eastman |

(Continued)

FOREIGN PATENT DOCUMENTS

| CN | 101659883 A | 3/2010 |
| EP | 0079092 | 5/1983 |
| GB | 2033563 | 5/1980 |
| GB | 2193444 | 2/1988 |

OTHER PUBLICATIONS

Unofficial English translation of CN Office Action issued Jun. 5, 2014 in connection with corresponding CN Patent Application No. 201110255462.4.

*Primary Examiner* — Imran Akram
(74) *Attorney, Agent, or Firm* — Fletcher Yoder, P.C.

(57) ABSTRACT

A system, including, a gasifier, including: a gasification region, an inner wall surrounding the gasification region, and a first fuel path extending along the inner wall, wherein the first fuel path is configured to flow a first fuel to cool the gasifier, and the gasifier is configured to inject the first fuel from the first fuel path into the gasification region.

19 Claims, 7 Drawing Sheets

(56) References Cited

U.S. PATENT DOCUMENTS

| | | | |
|---|---|---|---|
| 3,744,439 A * | 7/1973 | Laustsen | 110/346 |
| 4,272,255 A | 6/1981 | Coates | |
| 4,328,007 A | 5/1982 | Rafael | |
| 4,392,869 A * | 7/1983 | Marion et al. | 48/197 R |
| 4,459,136 A * | 7/1984 | Linneborn et al. | 48/111 |
| 4,707,163 A | 11/1987 | Gudymov et al. | |
| 4,818,253 A | 4/1989 | Kohnene et al. | |
| 4,954,246 A * | 9/1990 | Punwani et al. | 208/402 |
| 5,216,982 A * | 6/1993 | Firey | 123/23 |
| 5,247,792 A * | 9/1993 | Coffinberry | 60/39.463 |
| 5,266,086 A * | 11/1993 | Bailey et al. | 48/203 |
| 5,529,484 A * | 6/1996 | Moard et al. | 431/242 |
| 5,656,043 A * | 8/1997 | Dobbeling | 48/197 R |
| 6,827,912 B2 | 12/2004 | Schingnitz et al. | |
| 8,152,874 B2 * | 4/2012 | Briesch et al. | 48/127.1 |
| 2002/0148161 A1 * | 10/2002 | Iijima et al. | 48/199 FM |
| 2008/0098653 A1 * | 5/2008 | Patil et al. | 48/76 |
| 2008/0172941 A1 | 7/2008 | Jancker et al. | |
| 2008/0263952 A1 * | 10/2008 | Miyoshi et al. | 48/76 |
| 2009/0061372 A1 * | 3/2009 | Just et al. | 431/284 |
| 2010/0263841 A1 * | 10/2010 | Corry et al. | 165/133 |
| 2010/0313442 A1 * | 12/2010 | Russell et al. | 34/468 |
| 2011/0116987 A1 * | 5/2011 | Schulze et al. | 422/202 |

* cited by examiner

GASIFIER COOLING SYSTEM

BACKGROUND OF THE INVENTION

The subject matter disclosed herein relates to gasifiers, and more specifically to systems for cooling the gasifier.

Integrated gasification combined cycle (IGCC) power plants are capable of generating energy from various hydrocarbon feedstock, such as coal, relatively cleanly and efficiently. IGCC technology may convert the hydrocarbon feedstock into a gas mixture of carbon monoxide (CO) and hydrogen ($H_2$), i.e., syngas, by reaction with oxygen and steam in a gasifier. These gases may be cleaned, processed, and utilized as fuel in a conventional combined cycle power plant. The gasification process occurring within the gasifier can reach temperatures up to 3500 degrees Fahrenheit. Thus, a cooling system may be used to cool the gasifier. Unfortunately, existing cooling systems may result in a significant amount of waste energy (e.g., heat) and/or a decrease in the efficiency of the IGCC power plant.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasifier having a gasification region, an inner wall surrounding the gasification region, and a first fuel path extending along the inner wall. The first fuel path is configured to flow a first fuel to cool the gasifier. The gasifier is configured to inject the first fuel from the first fuel path into the gasification region.

In a second embodiment, an apparatus includes a gasifier having a gasification region, an inner wall surrounding the gasification region, an outer wall surrounding the inner wall, and a first fuel path extending between the inner wall and the outer wall. The first fuel path is configured to flow a first fuel to cool the gasifier. The apparatus also includes a heat exchanger configured to transfer heat from the first fuel of the first fuel path to a fluid of an external path.

In a third embodiment, a system includes a gasifier having a gasification region, a wall surrounding the gasification region, and a non-aqueous fluid path extending along the wall. The non-aqueous fluid path is configured to flow a non-aqueous fluid to cool the gasifier. The system also includes a plant component configured to receive the non-aqueous fluid from the non-aqueous fluid path.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments relate to a system and method for actively cooling a gasifier using a fuel feedstock as a coolant. The ability to actively cool the gasifier may be possible for all types of gasifiers, for example entrained flow gasifiers, fixed bed gasifiers, down flow gasifiers, up flow gasifiers, and fluidized bed gasifiers, with or without multi-feed injection. The fuel feedstock may include a carbonaceous fuel, such as a biofuel (e.g., biomass) or fossil fuel (e.g., hydrocarbon or oil). The fuel may be a liquid fuel, a slurry fuel (e.g., coal slurry), or any other fuel capable of flowing through a coolant path, while also being capable of gasification in the gasifier. As discussed in detail below, embodiments of an active cooling system include one or more coolant paths through the gasifier, such that the fuel feedstock absorbs heat from the gasifier prior to combustion. In some embodiments, the fuel feedstock is injected into the gasifier after absorbing heat from the gasifier, and undergoes a gasification process inside the gasifier. In other embodiments, the fuel feedstock may pass through a heat exchanger after absorbing heat from the gasifier, such that the fuel feedstock transfers at least a portion of the absorbed heat into another medium and/or component of the plant. For example, after absorbing heat from the gasifier, the fuel feedstock may transfer heat to a fluid (e.g., a gas or liquid), such as water, air, solvent, steam, or other process fluids in the plant. The heat added to the fluid may increase the efficiency of other components in the plant, and thus plant efficiency as a whole. The disclosed embodiments of the active cooling system may reduce the reliance on other coolants, reduce the amount of waste energy (e.g., heat), reduce the amount of refractory materials (e.g., insulative bricks or liners) used in the gasifier, and increase the efficiency of the gasifier. For example, the heat added to the fuel feedstock may improve the efficiency of the gasifier by adding energy to the gasification reaction zone directly with the fuel feedstock. In the active cooling system, the fuel feedstock also may create a layer of slag to mitigate transient heat transfer impacts in a manner that will self-repair.

Figure 1:
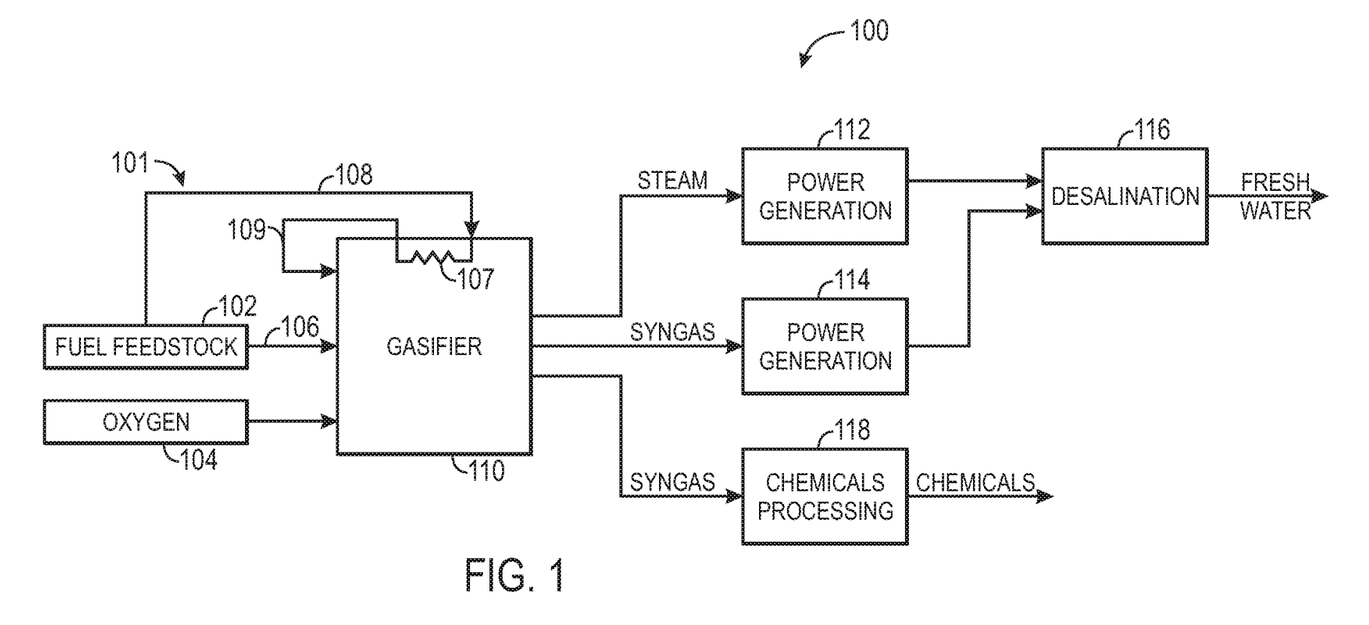
FIG. 1 is a block diagram of an embodiment of a gasification system having an active cooling system using a fuel feedstock as a coolant.

FIG. 1 is a block diagram of an embodiment of a gasification system 100 having an active cooling system 101 using a fuel feedstock 102 as a coolant. The fuel feedstock 102 and oxygen 104 may be provided to a gasifier 110 to produce syngas. The fuel feedstock 102 may enter the gasifier 110 along a plurality of different paths, including fuel paths 106 and 108. For example, the fuel path 106 may represent a direct fuel injection path of the fuel feedstock 102 into the gasifier 110 without absorbing heat from the gasifier 110 prior to injection. The fuel path 108 may represent an indirect fuel injection path of the fuel feedstock 102 into the gasifier 110 to enable heat absorption from the gasifier 106 prior to injection. Thus, the fuel path 108 includes a coolant path portion 107 and a fuel injection portion 109. The coolant path portion 107 routes the fuel feedstock 102 through a portion of the gasifier 110, such that the fuel feedstock 102 is able to absorb heat from the gasifier 110 for actively cooling of the gasifier 110. Subsequently, the fuel injection portion 109 injects the heated fuel feedstock 102 into the gasifier 110 along with the oxygen 104 to fuel a gasification reaction. As appreciated, the heat added to the fuel feedstock 102 improves the efficiency of the gasification reaction. Although the illustrated embodiment includes two fuel paths 108 and 110, other embodiments may eliminate the fuel path 106 and/or add additional fuel paths 108.

The syngas and steam produced by the gasification system 100 may be used for power generation and/or industrial chemicals processing. For example, the steam generated from the gasifier 106, a syngas cooler, a gas treatment unit, a heat recovery steam generator (HRSG), and/or other units in the system 100 may be provided to a power generation unit 112, such as a steam turbine engine. Some or all of the syngas may be provided to a power generation unit 114, such as a gas turbine engine. The power outputs of the power generation units 112 and 114 may be provided to a desalination system 116 that removes salt, or salt and other minerals, from saltwater to produce freshwater. In some embodiments, some or all of the syngas may be provided to an industrial chemicals processing system 118 to produce industrial chemicals from the syngas and other inputs. Such industrial chemicals may include ammonia, methanol, or any other producible industrial chemical.

Figure 2:
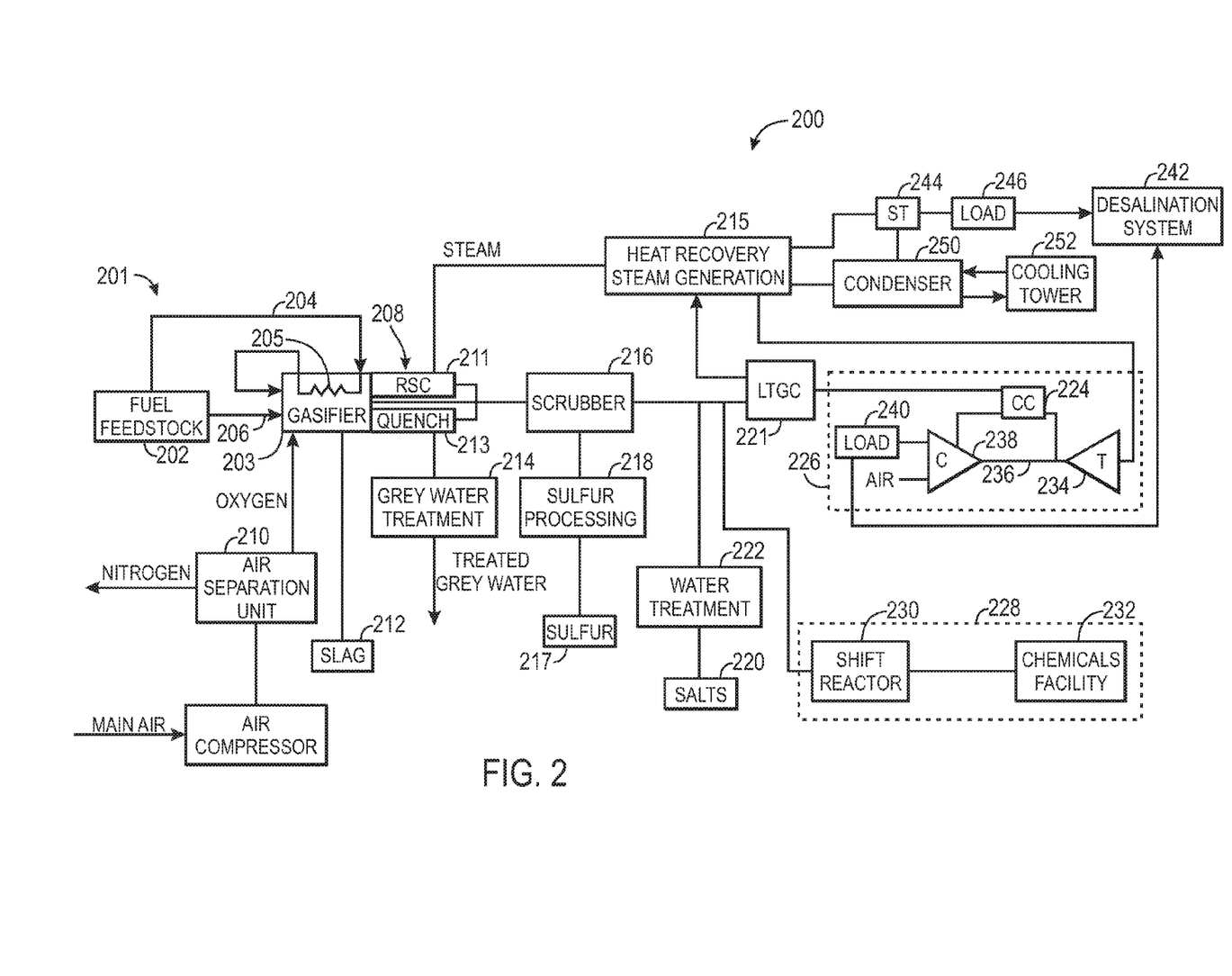
FIG. 2 is a block diagram of an embodiment of an integrated gasification combined cycle (IGCC) power plant having an active cooling system using a fuel feedstock as a coolant.

FIG. 2 is a block diagram of an embodiment of an integrated gasification combined cycle (IGCC) power plant 200 having an active cooling system 201 using a fuel feedstock 202 as a coolant. As described above, the fuel feedstock 202 may be used to actively cool a gasifier 203 along a fuel path 204 of the active cooling system 201. For example, the fuel path 204 may include one or more coolant tubes 205 extending along a wall of the gasifier 203, either internal or external to the gasifier 203. By further example, the coolant tubes 205 may extend between the wall of the gasifier 203 and refractory materials (e.g., liner, bricks, etc.) surrounding a gasification reaction zone inside the gasifier 203. In turn, the fuel feedstock 202 may flow from the coolant tubes 205 into the gasifier 203 to at least partially or entirely fuel the gasification reaction inside the gasifier 203. In this manner, the fuel feedstock 202 acts as a coolant to thermally protect the gasifier 203, while also adding heat back to the gasification reaction directly through the fuel feedstock 202 flowing into the gasifier 203. In the illustrated embodiment, the gasifier 203 also receives a flow of the fuel feedstock 202 along a fuel path 206 into the gasifier 203 to further fuel the gasification reaction inside the gasifier 203.

The fuel feedstock 202 may be any number of fuels, such as liquid, solid, or slurry fuels. The fuel may include a variety of carbonaceous fuels, such as a biofuel (e.g., biomass) or a fossil fuel (e.g., hydrocarbon or oil). If the fuel is a solid (e.g., coal), then the fuel may be prepared by shredding, pulverizing, briquetting, or pelletizing. A solid fuel also may be mixed with a suitable liquid, such as water, to create a slurry feedstock. In one embodiment, the fuel feedstock 202 may be ground and mixed with water to generate a coke slurry. By mixing the dry fuel with a liquid, the slurry is capable of actively cooling the gasifier 203 before being used to feed the gasifier 203.

The gasifier 203 may convert the fuel feedstock 202 into a combination of carbon monoxide and hydrogen, e.g., syngas. This conversion may be accomplished by subjecting the fuel feedstock 202 to a controlled amount of steam and high-pressure oxygen, e.g., from approximately 20 to 85 bar, and temperatures, e.g., approximately 700 to 1600 degrees Celsius, depending on the type of gasifier utilized. The gasification process may also include the fuel feedstock 202 undergo a pyrolysis process, whereby the fuel feedstock 202 is heated. Temperatures inside the gasifier 203 of the gasification subsystem may range from approximately 150 to 700 degrees Celsius during the pyrolysis process, depending on the fuel feedstock 202. The heating of the feedstock during the pyrolysis process may generate a solid, e.g., char, and residue gases, e.g., carbon monoxide, hydrogen, and nitrogen. The char remaining from the feedstock from the pyrolysis process may only weigh up to approximately 40-20% of the weight of the original feedstock.

A combustion process may then occur in the gasifier 203. In the illustrated embodiment, an air separation unit (ASU) 210 supplies oxygen to the gasifier 203 to facilitate the combustion process. For example, the ASU 210 receives air from a compressor 209, and separates the air into component gases, e.g., oxygen and nitrogen. The ASU 210 may employ distillation techniques (e.g., cryogenic distillation), pressure swing adsorption (PSA), or another suitable process. In certain embodiments, the plant 200 may employ a portion of the nitrogen in a combustor 224 of a turbine engine 226, while the oxygen is used in the gasifier 203.

Accordingly, the oxygen is received by the gasifier 203 from the ASU 210 for combustion purposes. The combustion may include introducing oxygen to the char and residue gases so that the char and residue gases may react with the oxygen to form carbon dioxide and carbon monoxide, thus providing heat for the subsequent gasification reactions. The temperatures during the combustion process may range from approximately 700 to 1600 degrees Celsius. In some embodiments, steam may be introduced into the gasifier 203 during a gasification step. The char may react with the carbon dioxide and steam to produce carbon monoxide and hydrogen at temperatures ranging from approximately 800 to 1100 degrees Celsius.

In this way, a resultant syngas is manufactured by the gasifier 203. This resultant gas may include approximately 80-90% of carbon monoxide and hydrogen, as well as $CH_4$, $CO_2$, $H_2O$, HCl, HF, COS, $NH_3$, HCN, and $H_2S$ (based on the sulfur content of the feedstock). This resultant gas may be termed dirty syngas. The gasifier 203 may also generate waste, such as slag 212, which may be a wet ash material. This slag 212 may be removed from the gasifier 203, such as through one or more lockhoppers, and disposed of, for example, as road base or as another building material. Greywater from the gasifier 203 may be routed to a water treatment unit 214 to remove ammonia and solids. The treated greywater may be routed to deepwell injection, biological treatment, or a zero process water discharge unit.

In certain embodiments, the gasifier 203 may be coupled to a cooling unit 208, e.g., a radiant syngas cooler (RSC) 211 and/or a quench cooling unit 213, to cool the syngas generated by the gasifier 203. As the heat transfers from the syngas to the cooling unit 208, the cooling unit may generate steam for use in the plant 200. For example, some or all of the steam may be provided to a heat recovery steam generator system (HRSG) 215, as described further below.

The plant 200 also may include a gas treatment system, e.g., a scrubber 216, to treat the syngas generated by the gasifier 203. The scrubber 216 may scrub the dirty syngas to remove the HCl, HF, COS, HCN, and $H_2S$ from the dirty syngas, which may include separation of sulfur 217 in a sulfur processor 218 by, for example, an acid gas removal process in the sulfur processor 218. Furthermore, the gas treatment system may separate salts 220 from the syngas via a water treatment unit 222 that may utilize water purification techniques to generate usable salts 220 from the syngas. In this manner, the gas treatment system produces treated or clean syngas for use throughout the plant 200. Some of the clean syngas may be provided to a low temperature gas cooling (LTGC) unit 221 that recovers heat and cools the syngas. Steam generated by the LTGC unit 221 may be provided to the HRSG 215, as described further below. The cleaned and cooled syngas may be routed to the combustor 224, e.g., a combustion chamber, of the gas turbine engine 226 as combustible fuel.

Some of the clean syngas may be provided to a chemical processing system 228. The chemical processing system 228 may include a shift reactor 230. The shift reactor 230 may process the clean syngas to produce an appropriate ratio of carbon monoxide and hydrogen ration for chemical production. After shift and heat recovery, the syngas may be routed to a chemicals facility 232, e.g., a methanol or ammonia converter.

As mentioned above, some or all of the clean syngas may be transmitted from the scrubber 216 to the combustor 224 of the gas turbine engine 226. The gas turbine engine 226 may include a turbine 234, a drive shaft 236 and a compressor 238, as well as the combustor 224. The combustor 224 may receive fuel, such as syngas, which may be injected under pressure from fuel nozzles. This fuel may be mixed with compressed air as well as compressed nitrogen and combusted within combustor 224. This combustion may create hot pressurized combustion gases.

The combustor 224 may direct the combustion gases towards an inlet of the turbine 234. As the combustion gases from the combustor 224 pass through the turbine 234, the combustion gases may force turbine blades in the turbine 234 to rotate the drive shaft 236 along an axis of the gas turbine engine 226. As illustrated, drive shaft 236 is connected to various components of the gas turbine engine 226, including the compressor 238.

The drive shaft 236 may connect the turbine 234 to the compressor 238 to form a rotor. The compressor 238 may include blades coupled to the drive shaft 236. Thus, rotation of turbine blades in the turbine 234 causes the drive shaft 236 connecting the turbine 234 to the compressor 238 to rotate blades within the compressor 238. This rotation of blades in the compressor 238 may cause the compressor 238 to compress air received via an air intake in the compressor 238. The compressed air may then be fed to the combustor 224 and mixed with fuel and compressed nitrogen to allow for higher efficiency combustion. Drive shaft 236 may also be connected to load 240, which may be a stationary load, such as an electrical generator for producing electrical power, for example, in a power plant. Indeed, load 240 may be any suitable device that is powered by the rotational output of the gas turbine engine 234.

In one embodiment, the load 240 may be coupled to and power a desalination system 242. The desalination system 242 may process saltwater to remove salt and other dissolved solids and minerals from the saltwater using power provided by the turbine engine 226. The desalination system 242 may output freshwater for human consumption (e.g., drinking water), irrigation, and/or any other suitable purpose. Thus, the desalination system 242 is powered by syngas provided to the turbine engine 226 and generated from the fuel feedstock 202.

The IGCC system 200 also may include a steam turbine engine 244 and the heat recovery steam generation (HRSG) system 215. The steam turbine engine 244 may drive a second load 246. The second load 246 may also be an electrical generator for generating electrical power. However, both the first and second loads 240 and 246 may be other types of loads capable of being driven by the gas turbine engine 226 and steam turbine engine 244. In addition, although the gas turbine engine 226 and steam turbine engine 244 may drive separate loads 240 and 246 as shown in the illustrated embodiment, the gas turbine engine 226 and steam turbine engine 244 may also be utilized in tandem to drive a single load via a single shaft. The specific configuration of the steam turbine engine 226, as well as the gas turbine engine 244, may be implementation-specific and may include any combination of sections. In one embodiment, the load 240 may provide power to the desalination system 242. As described above, the desalination system 242 may process saltwater and separate fresh water and salt from the saltwater using power provided by the steam engine 244.

In combined cycle systems such as IGCC system 200, hot exhaust may flow from the gas turbine engine 226 and pass to the HRSG 215, where it may be used to generate high-pressure, high-temperature steam. The steam produced by the HRSG 215 may then be passed through the steam turbine engine 244 for power generation. In addition, the produced steam may also be supplied to any other processes where steam may be used, such as to the gasifier 203. The gas turbine engine 226 generation cycle is often referred to as the "topping cycle," whereas the steam turbine engine 244 generation cycle is often referred to as the "bottoming cycle." By combining these two cycles as illustrated in FIG. 2, the IGCC system 200 may lead to greater efficiencies in both cycles. In particular, exhaust heat from the topping cycle may be captured and used to generate steam for use in the bottoming cycle.

As described above, the HRSG 215 may receive steam from the cooling unit 208, the LTGC 221, and/or from heated exhaust gas from the gas turbine engine 226. Any of these outputs may be routed to the HRSG 215 and used to heat water and produce steam to power the steam turbine engine 244. Alternatively, in some embodiments, the HRSG 215 may be omitted and steam from the cooling unit 208, the LTGC 221, and/or the gas turbine engine 226 may be provided directly to the steam turbine 244. Exhaust from, for example, a low-pressure section of the steam turbine 244 may be directed into a condenser 250. The condenser 250 may utilize a cooling tower 252 to exchange heated water for chilled water. Cooling tower 252 acts to provide cool water to the condenser 250 to aid in condensing the steam transmitted to the condenser 250 from the steam turbine 244. Condensate from the condenser 250 may, in turn, be directed into the HRSG 215. Again, exhaust from the gas turbine engine 226 may also be directed into the HRSG 215 to heat the water from the condenser 250 and produce steam.

Figure 3:
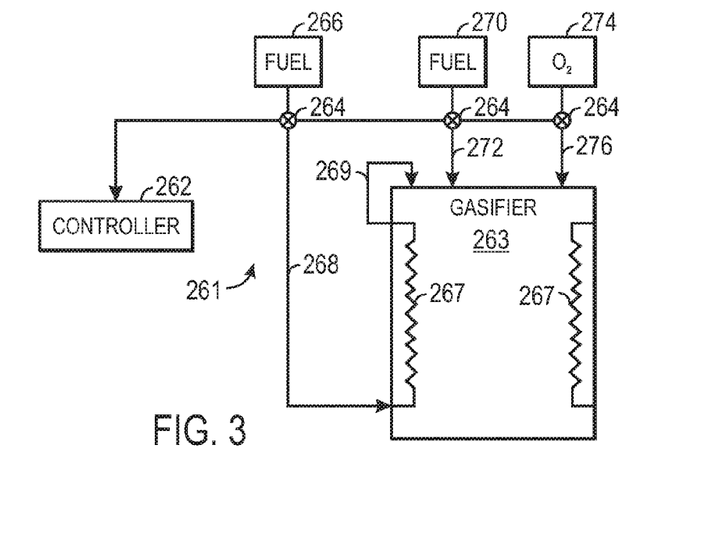
FIG. 3 is a block diagram of an embodiment of a gasifier having an active cooling system using a fuel feedstock as a coolant.

FIG. 3 is a block diagram of an embodiment of a gasification system 260 having an active cooling system 261 using a fuel feedstock as a coolant. A controller 262 controls the injection of both fuel and oxygen into a gasifier 263 through a plurality of valves 264. In the illustrated embodiment, the gasification system 260 includes a first fuel source 266 coupled to a first fuel line or path 268 leading through and subsequently into the gasifier 263, a second fuel source 270 coupled to a second fuel line or path 272 leading into the gasifier 263 separate from the first fuel path 268, and an oxygen source 274 coupled to an oxygen line or path 276 leading into the gasifier 263.

The first fuel path 268 facilitates heat transfer from the gasifier 263 into the first fuel 266 flowing along the path 268, thereby cooling the gasifier 263 and heating up the first fuel 266. Thus, the first fuel path 268 may be described as a first coolant path using the fuel 266 as the coolant. As illustrated, the first fuel path 268 includes a heat exchanger portion 267 followed by a fuel injection portion 269. The heat exchanger portion 267 may include one or more coolant tubes extending along a wall of the gasifier 263, either inside or outside of the gasifier 263. The fuel injection portion 269 is configured to inject the first fuel 266, after absorbing heat in the heat exchanger portion 267, into the gasifier 263. After the first fuel 266 is injected into the gasifier 263, the fuel 266 mixes with oxygen 274 to fuel a gasification reaction. In contrast, the second fuel path 272 does not route the second fuel 270 through the gasifier 263 for active cooling, but rather the path 272 directly injects the second fuel 270 into the gasifier 263 to fuel the gasification reaction in combination with the first fuel 266 and the oxygen 274.

The controller 262 is configured to control the gasification reaction and the active cooling provided by the first fuel 266. For example, the controller 262 is configured to adjust the valves 264 to control the flow of the first fuel 266, the second fuel 270, and the oxygen 274 into the gasifier 263 to vary a fuel/oxygen ratio in the gasifier 263. By further example, the controller 262 is configured to adjust the valve 264 along the first fuel path 268 to control the fuel flow rate through the heat exchanger portion 267, and thus the amount of active cooling of the gasifier 263 by the first fuel 266. Control of the valve 264 along the first fuel path 268 also controls the amount of heat carried by the first fuel 266 into the gasifier 263 through the fuel injection portion 269, thereby varying the amount of heat input into the gasification reaction. Thus, the controller 262 may increase an opening of the valve 264 along the first fuel path 268 to increase active cooling of the gasifier 263 and increase heat input into the gasification reaction, whereas the controller 262 may decrease an opening of the valve 264 along the first fuel path 268 to decrease active cooling of the gasifier 263 and decrease heat input into the gasification reaction. In addition, the controller 262 may adjust an opening of the valve 264 along the second fuel path 270 depending on the amount of the first fuel 266 flowing along the first fuel path 268. Thus, the controller 262 may provide adjustments between a first configuration providing only the first fuel 266 through the first fuel path 268 without any of the second fuel 270 through the second fuel path 272, and a second configuration providing only the second fuel 270 through the second fuel path 272 without any of the first fuel 266 through the first fuel path 268.

Although illustrated as two separate fuel sources 266 and 270, the first and second fuels 266 and 270 may be the same or different from one another. In an embodiment with the same fuels, the fuel sources 266 and 270 may be combined as a single fuel source. The first and second fuels 266 and 270 may include a variety of carbonaceous fuels, such as a biofuel (e.g., biomass) or fossil fuel (e.g., hydrocarbon or oil). The first and second fuels 266 and 270 also may be in a variety of forms, such as liquids, gases, slurries, solids, or some combination thereof. For example, the first fuel 266 may be a liquid or slurry fuel, whereas the second fuel 270 may be a liquid, gas, slurry, or solid fuel.

Figure 4:
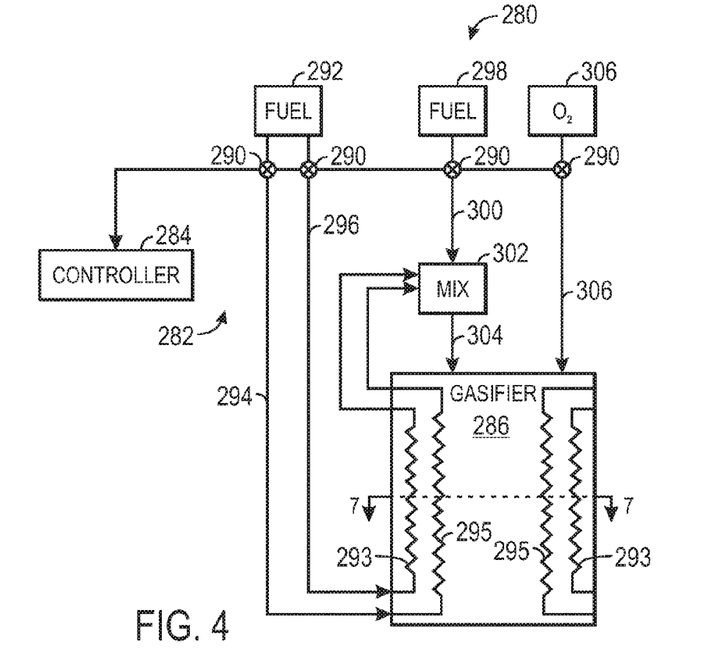
FIG. 4 is a block diagram of an embodiment of a gasifier having an active cooling system using a fuel feedstock as a coolant.

FIG. 4 is a block diagram of an embodiment of a gasification system 280 having an active cooling system 282 using a fuel feedstock as a coolant. A controller 284 controls the injection of both fuel and oxygen into a gasifier 286 through a plurality of valves 290. In the illustrated embodiment, the gasification system 280 includes a first fuel source 292 coupled to a first fuel line or path 294 and a second fuel line or path 296, wherein the first and second fuel paths 294 and 296 lead through and subsequently into the gasifier 286. The gasification system 280 also includes a second fuel source 298 coupled to a third fuel line or path 300 leading into the gasifier 286 in combination with the first fuel from the first and second fuel paths 294 and 296. The first, second, and third fuel paths 294, 296, and 300 converge into a mixing chamber 302, which facilitates fuel mixing prior to injection into the gasifier 286 along a mixed fuel line or path 304. The gasification system 280 also includes an oxygen source 306 coupled to an oxygen line or path 306 leading into the gasifier 286.

The first and second fuel paths 294 and 296 facilitate heat transfer from the gasifier 286 into the first fuel 292 flowing along the paths 294 and 296, thereby cooling the gasifier 286 and heating up the first fuel 292. Thus, the first and second fuel paths 294 and 296 may be described as first and second coolant paths using the fuel 292 as the coolant. As illustrated, the first fuel path 294 includes a first heat exchanger portion 293, and the second fuel path 296 includes a second heat exchanger portion 295. The heat exchanger portions 293 and 295 may include one or more coolant tubes extending along a wall of the gasifier 286, either inside or outside of the gasifier 286. In the illustrated embodiment, the first heat exchanger portion 293 may be disposed at a first diameter of the gasifier 286, and the second heat exchanger portion 295 may be disposed at a second diameter of the gasifier 286. The first and second diameters may be the same or different from one another. The illustrated first diameter is larger than the second diameter, such that the first heat exchanger portion 293 surrounds the second heat exchanger portion 295 (e.g., concentric or coaxial arrangement). After absorbing heat in the first and second heat exchanger portions 293 and 295, the first fuel 292 continues along the first and second fuel paths 294 and 296 into the mixing chamber 302. The mixing chamber 302 enables mixing of the first and second fuels 292 and 298, thereby mixing the fuel compositions as well as the different temperatures of the fuels 292 and 298. After the fuel mixture 304 is injected into the gasifier 286, the fuel mixture 304 further mixes with oxygen 306 to fuel a gasification reaction.

The controller 284 is configured to control the gasification reaction and the active cooling provided by the first fuel 292. For example, the controller 284 is configured to adjust the valves 290 to control the flow of the first fuel 292, the second fuel 298, and the oxygen 306 into the gasifier 286 to vary a fuel/oxygen ratio in the gasifier 286. By further example, the controller 284 is configured to adjust the valves 290 along the first and second fuel paths 294 and 296 to control the fuel flow rate through the heat exchanger portions 293 and 295, and thus the amount of active cooling of the gasifier 286 by the first fuel 292. Control of the valve 290 along the first and second fuel paths 294 and 296 also controls the amount of heat carried by the first fuel 292 into the gasifier 286, thereby varying the amount of heat input into the gasification reaction. Thus, the controller 284 may increase an opening of the valves 290 along the first and second fuel paths 294 and 296 to increase active cooling of the gasifier 286 and increase heat input into the gasification reaction, whereas the controller 284 may decrease an opening of the valves 290 along the first and second fuel paths 294 and 296 to decrease active cooling of the gasifier 286 and decrease heat input into the gasification reaction. In addition, the controller 284 may adjust an opening of the valve 290 along the third fuel path 300 depending on the amount of the first fuel 292 flowing along the first and second fuel paths 294 and 296. Thus, the controller 284 may provide adjustments between a first configuration providing only the first fuel 292 through the first and/or second fuel paths 294 and 296 without any of the second fuel 298 through the third fuel path 300, and a second configuration providing only the second fuel 298 through the third fuel path 300 without any of the first fuel 292 through the first and second fuel paths 294 and 296. The controller 284 also may provide adjustments between a first active cooling configuration providing the first fuel 292 through both the first and second fuel paths 294 and 296, a second active cooling configuration providing the first fuel 292 only through the first fuel path 294 without any fuel through the second fuel path 296, and a third active cooling configuration providing the first fuel 292 through only through the second fuel path 296 without any fuel through the first fuel path 294. As appreciated, the first and second heat exchanger portions 293 and 295 may be disposed in different regions within the gasifier 286, and thus different amounts of cooling may be desirable for efficient operation of the gasifier 286. The controller 284 is able to adjust the fuel flows through these different regions to provide adequate cooling of the gasifier 286.

Although illustrated as two separate fuel sources 292 and 298, the first and second fuels 292 and 298 may be the same or different from one another. In an embodiment with the same fuels, the fuel sources 292 and 298 may be combined as a single fuel source. The first and second fuels 292 and 298 may include a variety of carbonaceous fuels, such as a biofuel (e.g., biomass) or fossil fuel (e.g., hydrocarbon or oil). The first and second fuels 292 and 298 also may be in a variety of forms, such as liquids, gases, slurries, solids, or some combination thereof. For example, the first fuel 292 may be a liquid or slurry fuel, whereas the second fuel 298 may be a liquid, gas, slurry, or solid fuel. In certain embodiments, the first fuel 292 may be a liquid or slurry fuel, the second fuel 298 may be a solid or dry fuel (e.g., coal), and the fuels 292 and 298 mix with one another in the mixing chamber 302 to form a slurry fuel.

Figure 5:
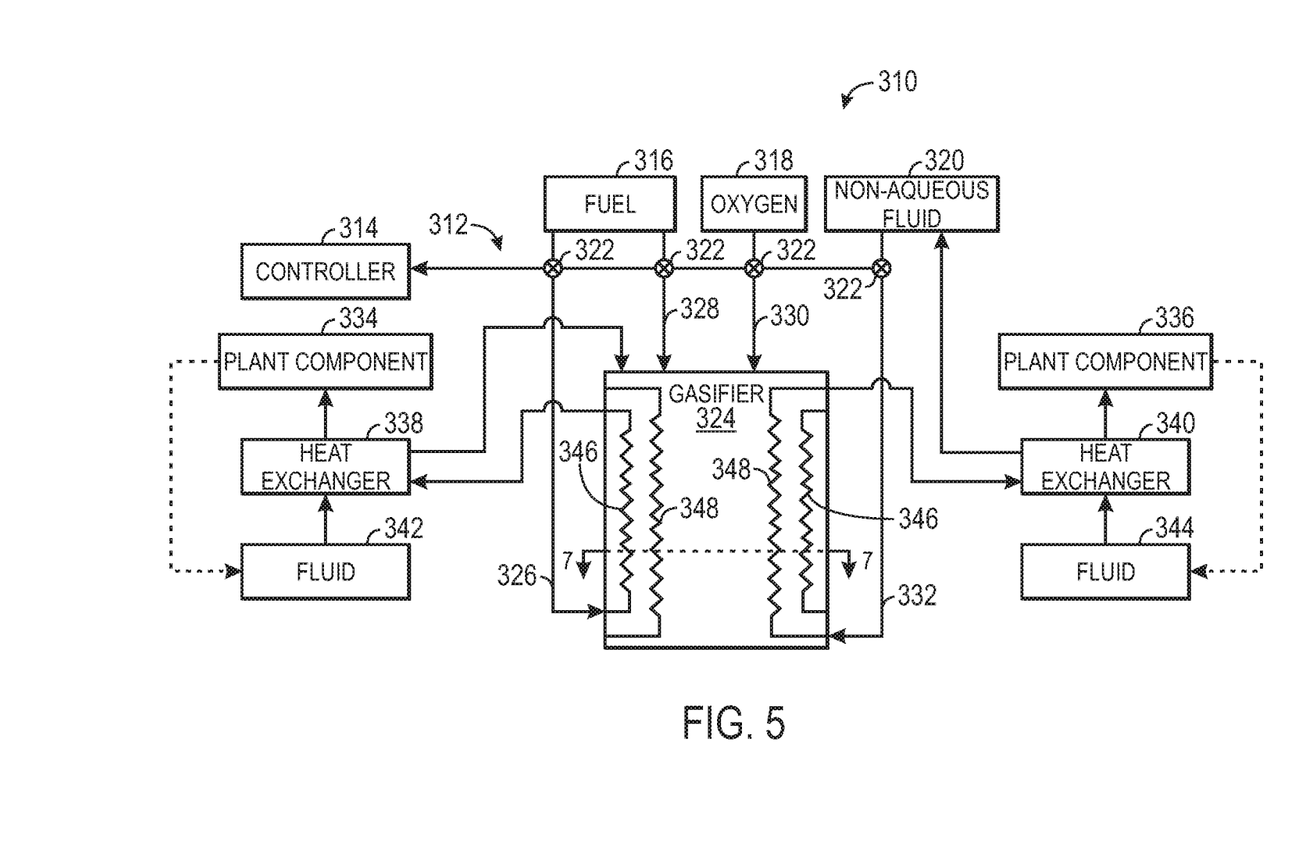
FIG. 5 is a block diagram of an embodiment of a gasifier having an active cooling system using a fuel feedstock as a coolant.

FIG. 5 is a block diagram of an embodiment of a system 310 having an active cooling system 312 using a fuel feedstock and a non-aqueous fluid as coolants. A controller 314 controls the flow of a fuel 316, oxygen 318, and a non-aqueous fluid 320 through a plurality of valves 322. For example, the controller 314 controls the injection of both fuel 316 and oxygen 318 into a gasifier 324 to fuel a gasification reaction inside the gasifier 324. In the illustrated embodiment, the system 310 includes a fuel source 316 coupled to a first fuel line or path 326 and a second fuel line or path 328, wherein the first fuel path 326 leads through and subsequently into the gasifier 324 and the second fuel path 328 leads directly into the gasifier 324. The system 310 also includes an oxygen source 318 coupled to an oxygen line or path 330 leading into the gasifier 324. The system 310 also includes a non-aqueous fluid source 320 coupled to a non-aqueous fluid line or path 332 leading through and subsequently away from the gasifier 324. As discussed below, the fuel path 326 and the non-aqueous fluid path 332 are configured to provide active cooling of the gasifier 324 in response to control by the controller 314, while also transferring heat away from the gasifier 324 to external plant components 334 and 336 via heat exchangers 338 and 340 and associated coolants (e.g., fluids) 342 and 344, respectively. In the illustrated embodiment, the fuel path 326 and the non-aqueous fluid path 332 flow in the same direction (e.g., upward direction) through the gasifier 324. Other embodiments may flow the fuel 316 and the non-aqueous fluid 320 both in the downward direction, or in opposite directions relative to one another.

The fuel path 326 and the non-aqueous fluid path 332 facilitate heat transfer from the gasifier 324 into the fuel 316 and the fluid 320 flowing along the paths 326 and 332, thereby cooling the gasifier 324 and heating up the fuel 316 and the fluid 320. Thus, the fuel path 326 may be described as a first coolant path using the fuel 316 as the coolant, while the non-aqueous fluid path 332 may be described as a second coolant path using the non-aqueous fluid 320 as the coolant. As illustrated, the fuel path 326 includes a first heat exchanger portion 346, and the non-aqueous fluid path 332 includes a second heat exchanger portion 348. The heat exchanger portions 346 and 348 may include one or more coolant tubes extending along a wall of the gasifier 324, either inside or outside of the gasifier 324. In the illustrated embodiment, the first heat exchanger portion 346 may be disposed at a first diameter of the gasifier 324, and the second heat exchanger portion 348 may be disposed at a second diameter of the gasifier 324. The first and second diameters may be the same or different from one another. The illustrated first diameter is larger than the second diameter, such that the first heat exchanger portion 346 surrounds the second heat exchanger portion 348 (e.g., concentric or coaxial arrangement). However, other embodiments may arrange the second heat exchanger portion 348 around the first heat exchanger portion 346.

After absorbing heat in the first and second heat exchanger portions 346 and 348, the fuel 316 flows to the heat exchanger 338 while the non-aqueous fluid 320 flows to the heat exchanger 340. In the illustrated embodiment, the heat exchanger 338 transfers heat from the fuel 316 to the fluid 342 and/or the plant component 334, while the heat exchanger 340 transfers heat from the non-aqueous fluid 320 to the fluid 344 and/or the plant component 336. For example, the fluids 342 and 344 may be working fluids, such as water, steam, or solvent, that circulate through the respective plant components 334 and 336. In certain embodiments, the plant components 334 and 336 may include various IGCC components, such as gas treatment components, gas cooling components, HRSG components, carbon capture components, gas turbine engines, steam turbines, boilers, distillers, strippers, absorbers, steam generators, or any combination thereof.

The controller 314 is configured to control the gasification reaction and the active cooling provided by the fuel 316 and the non-aqueous fluid 320. For example, the controller 314 is configured to adjust the valves 322 to control the flow of the fuel 316 and the oxygen 318 into the gasifier 324 to vary a fuel/oxygen ratio in the gasifier 324. By further example, the controller 314 is configured to adjust the valve 322 along the first fuel path 326 to control the fuel flow rate through the heat exchanger portion 346, and thus the amount of active cooling of the gasifier 324 by the first fuel 316. Control of the valve 322 along the first fuel path 326 also controls the amount of heat carried by the fuel 326 toward the heat exchanger 338, thereby varying the amount of heat input into the plant component 334. Similarly, the controller 314 is configured to adjust the valve 322 along the non-aqueous fluid path 332 to control the non-aqueous fluid flow rate through the heat exchanger portion 348, and thus the amount of active cooling of the gasifier 324 by the non-aqueous fluid 320. Control of the valve 322 along the non-aqueous fluid path 332 also controls the amount of heat carried by the fluid 320 toward the heat exchanger 340, thereby varying the amount of heat input into the plant component 336.

Thus, the controller 314 may increase an opening of the valves 322 along the paths 326 and 332 to increase active cooling of the gasifier 324 and increase heat input into the plant components 334 and 336, whereas the controller 314 may decrease an opening of the valves 322 along the paths 326 and 332 to decrease active cooling of the gasifier 324 and decrease heat input into the plant components 334 and 336. In certain embodiments, the controller 314 may use the fuel 316 for active cooling of the gasifier 324 without using the non-aqueous fluid 320 for active cooling, the controller 314 may use the non-aqueous fluid 320 for active cooling of the gasifier 324 without using the fuel 316 for active cooling, or the controller 314 may use some ratio of the fuel 316 and the non-aqueous fluid 320 for active cooling of the gasifier 324.

The fuel 316 and the non-aqueous fluid 320 may include a variety of mediums suitable for cooling the gasifier 324. For example, the fuel 316 may include a variety of carbonaceous fuels, such as a biofuel (e.g., biomass) or fossil fuel (e.g., hydrocarbon or oil). The fuel 316 also may be in a variety of forms, such as liquids, gases, slurries, solids, or some combination thereof. The non-aqueous fluid 320 may include a variety of working fluids or cooling mediums substantially free of water. For example, the non-aqueous fluid 320 may include a liquid, gas, slurry, or multi-phase flow. In certain embodiments, the non-aqueous fluid 320 may include a second fuel, either the same or different than the fuel 316. However, the non-aqueous fluid 320 may be a non-combustible fluid, a fluid not capable of gasification, or a combination thereof. Examples of the non-aqueous fluid 320 include, but are not limited to, plastics, liquid metals, etc. or a combination thereof.

Figure 6:
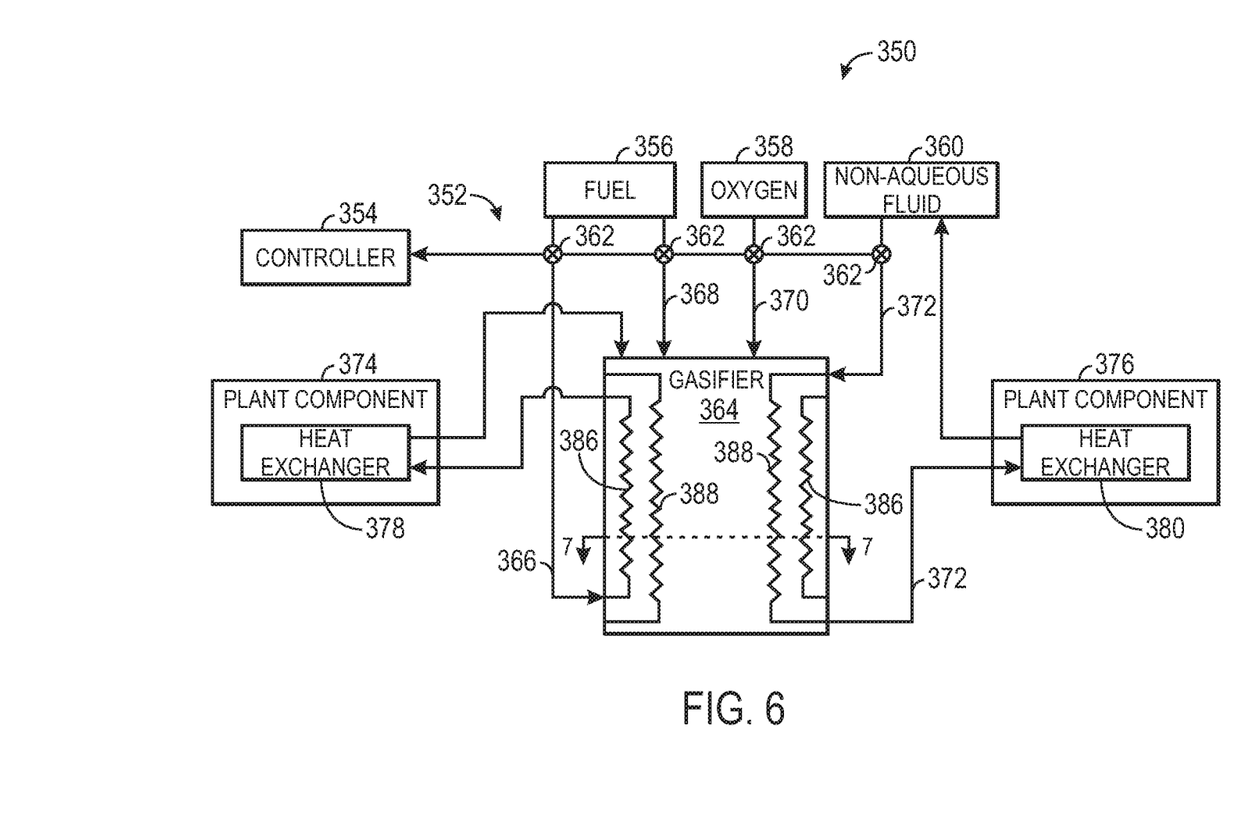
FIG. 6 is a block diagram of an embodiment of a gasifier having an active cooling system using a fuel feedstock as a coolant.

FIG. 6 is a block diagram of an embodiment of a system 350 having an active cooling system 352 using a fuel feedstock and a non-aqueous fluid as coolants. A controller 354 controls the flow of a fuel 356, oxygen 358, and a non-aqueous fluid 360 through a plurality of valves 362. For example, the controller 354 controls the injection of both fuel 356 and oxygen 358 into a gasifier 364 to fuel a gasification reaction inside the gasifier 364. In the illustrated embodiment, the system 350 includes a fuel source 356 coupled to a first fuel line or path 366 and a second fuel line or path 368, wherein the first fuel path 366 leads through and subsequently into the gasifier 364 and the second fuel path 368 leads directly into the gasifier 364. The system 350 also includes an oxygen source 358 coupled to an oxygen line or path 370 leading into the gasifier 364. The system 350 also includes a non-aqueous fluid source 360 coupled to a non-aqueous fluid line or path 372 leading through and subsequently away from the gasifier 364. As discussed below, the fuel path 366 and the non-aqueous fluid path 372 are configured to provide active cooling of the gasifier 364 in response to control by the controller 354, while also transferring heat away from the gasifier 364 to external plant components 374 and 376 via heat exchangers 378 and 380, respectively. In the illustrated embodiment, the fuel path 366 and the non-aqueous fluid path 372 flow in opposite directions (e.g., upward and downward) through the gasifier 364.

The fuel path 366 and the non-aqueous fluid path 372 facilitate heat transfer from the gasifier 364 into the fuel 356 and the fluid 360 flowing along the paths 366 and 372, thereby cooling the gasifier 364 and heating up the fuel 356 and the fluid 360. Thus, the fuel path 366 may be described as a first coolant path using the fuel 356 as the coolant, while the non-aqueous fluid path 372 may be described as a second coolant path using the non-aqueous fluid 360 as the coolant. As illustrated, the fuel path 366 includes a first heat exchanger portion 386, and the non-aqueous fluid path 372 includes a second heat exchanger portion 388. The heat exchanger portions 386 and 388 may include one or more coolant tubes extending along a wall of the gasifier 364, either inside or outside of the gasifier 364. In the illustrated embodiment, the first heat exchanger portion 386 may be disposed at a first diameter of the gasifier 364, and the second heat exchanger portion 388 may be disposed at a second diameter of the gasifier 364. The first and second diameters may be the same or different from one another. The illustrated first diameter is larger than the second diameter, such that the first heat exchanger portion 386 surrounds the second heat exchanger portion 388 (e.g., concentric or coaxial arrangement). However, other embodiments may arrange the second heat exchanger portion 388 around the first heat exchanger portion 386.

After absorbing heat in the first and second heat exchanger portions 386 and 388, the fuel 356 flows to the heat exchanger 378 while the non-aqueous fluid 360 flows to the heat exchanger 380. In the illustrated embodiment, the heat exchanger 378 transfers heat from the fuel 356 to the plant component 374, while the heat exchanger 380 transfers heat from the non-aqueous fluid 360 to the plant component 376. In certain embodiments, the plant components 374 and 376 may include various IGCC components, such as gas treatment components, gas cooling components, HRSG components, carbon capture components, gas turbine engines, steam turbines, boilers, distillers, strippers, absorbers, or any combination thereof. For example, the plant components 374 and 376 may be boilers that boil a fluid, vaporize a solvent, or the boilers may include a steam generator for vaporizes water into steam.

The controller 354 is configured to control the gasification reaction and the active cooling provided by the fuel 356 and the non-aqueous fluid 360. For example, the controller 354 is configured to adjust the valves 362 to control the flow of the fuel 356 and the oxygen 358 into the gasifier 364 to vary a fuel/oxygen ratio in the gasifier 364. By further example, the controller 354 is configured to adjust the valve 362 along the first fuel path 366 to control the fuel flow rate through the heat exchanger portion 386, and thus the amount of active cooling of the gasifier 364 by the first fuel 356. Control of the valve 362 along the first fuel path 366 also controls the amount of heat carried by the fuel 366 toward the heat exchanger 378, thereby varying the amount of heat input into the plant component 374. Similarly, the controller 354 is configured to adjust the valve 362 along the non-aqueous fluid path 372 to control the non-aqueous fluid flow rate through the heat exchanger portion 388, and thus the amount of active cooling of the gasifier 364 by the non-aqueous fluid 360. Control of the valve 362 along the non-aqueous fluid path 372 also controls the amount of heat carried by the fluid 360 toward the heat exchanger 380, thereby varying the amount of heat input into the plant component 376.

Figure 7:
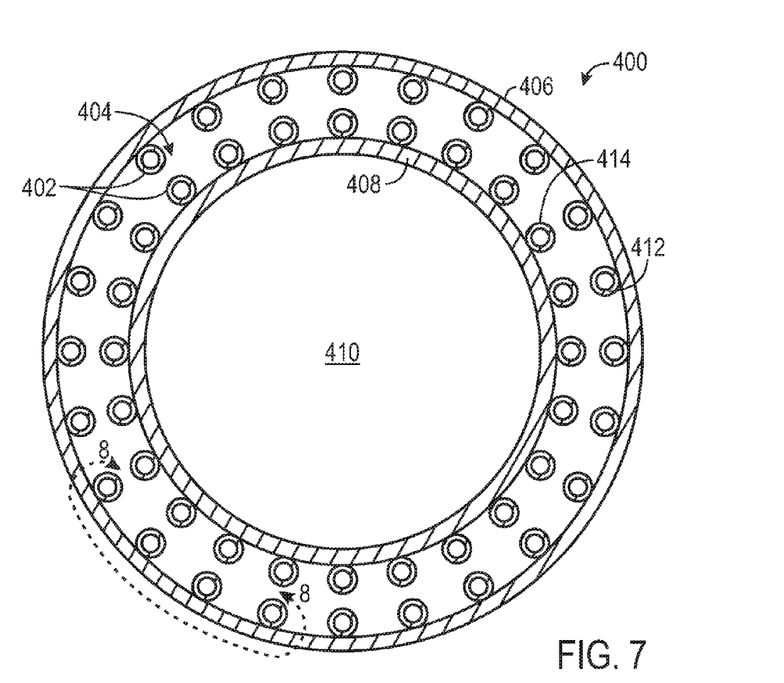
FIG. 7 is a cross-sectional view of an embodiment of a gasifier, taken along line 7-7 in FIGS. 4-6, illustrating coolant tubes of an active cooling system using a fuel feedstock as a coolant.

FIG. 7 is a cross-sectional view of an embodiment of a gasifier 400, taken along line 7-7 in FIGS. 4-6, illustrating coolant tubes 402 of an active cooling system 404 using a fuel feedstock as a coolant. In the illustrated embodiment, the gasifier 400 includes an outer wall 406 disposed at a first diameter, an inner wall 408 disposed at a second diameter smaller than the first diameter, and a gasification region 410 disposed inside the inner wall 408. The outer wall 406 may have a metallic construction, whereas the inner wall 408 may include refractory materials (e.g., ceramic) resistant to heat and/or chemical attack. For example, the inner wall 408 may include a plurality of refractory bricks arranged in an annular pattern around the gasification region 410, an annular layer of refractory material, or a combination thereof. The active cooling system 404, in the illustrated embodiment, arranges the coolant tubes 402 between the inner and outer walls 406 and 408. For example, the illustrated coolant tubes 402 include a first coolant tube arrangement/layer 412 and a second coolant tube arrangement/layer 414, wherein the first coolant tube arrangement/layer 412 surrounds the second coolant tube arrangement/layer 414 in a generally concentric or coaxial orientation. In certain embodiments, the first coolant tube arrangement/layer 412 may include a single coolant tube, or a plurality of coolant tubes, in thermal contact with the outer wall 406 to facilitate active cooling of the outer wall 406. Similarly, the second coolant tube arrangement/layer 414 may include a single coolant tube, or a plurality of coolant tubes, in thermal contact with the inner wall 408 to facilitate active cooling of the inner wall 408. The coolant tubes 402 of the first and second coolant tube arrangements/layers 412 and 414 are configured to flow one or more fuels, non-aqueous fluids, or a combination thereof, as discussed in detail above with reference to FIGS. 4-6.

Although the illustrated embodiment includes only two coolant tube arrangements/layers 412 and 414 in a concentric or coaxial orientation, other embodiments may include 3, 4, 5, 6, 7, 8, 9, 10, or more coolant tube arrangements/layers in a concentric or coaxial orientation. The coolant tubes 404 also may vary in diameter, material construction, and other characteristics from one arrangement/layer 412 to another arrangement/layer 414. For example, the arrangement/layer 412 may have a smaller tube diameter than the arrangement/layer 414, or vice versa. A controller, as discussed in detail above, also may be used to provide independent control of fluid flow rates through the coolant tubes 404 in the different arrangements/layers 412 and 414.

Figure 8:
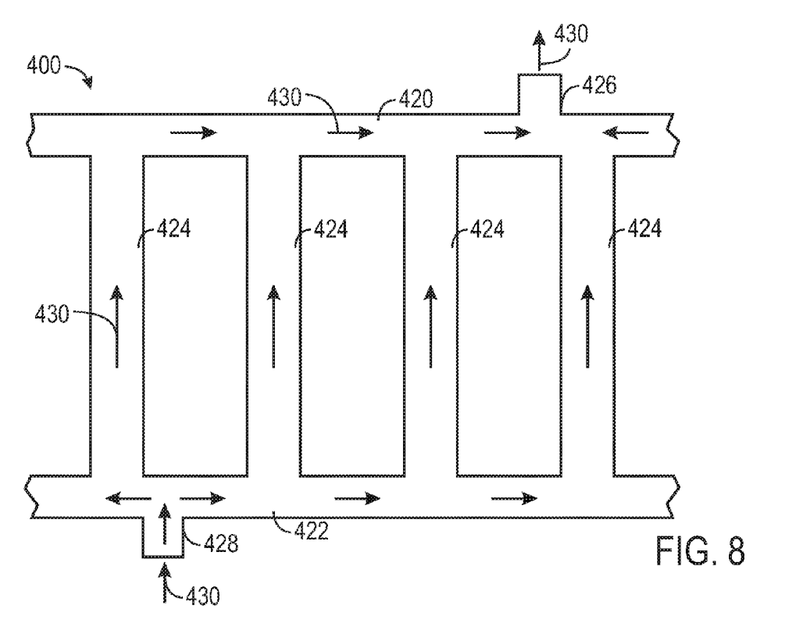
FIG. 8 is a partial schematic side view of an embodiment of an active cooling system, taken within line 8-8 in FIG. 7, using a fuel feedstock as a coolant, illustrating upper and lower coolant headers and intermediate coolant tubes.

FIG. 8 is a partial schematic side view of an embodiment of an active cooling system 418, taken within line 8-8 in FIG. 7, using a fuel feedstock as a coolant, illustrating upper and lower coolant headers 420 and 422 (or manifolds) and intermediate coolant tubes 424. In the illustrated embodiment, a fluid (e.g., fuel feedstock or non-aqueous fluid) flows through the coolant headers 420 and 422 and the intermediate coolant tubes 424 to provide active cooling of a gasifier. The upper coolant header 420 includes a port 426, which may be an inlet or outlet port depending on the flow configuration of the active cooling system 418. Similarly, the lower coolant header 422 includes a port 428, which may be an inlet or outlet port depending on the flow configuration of the active cooling system 418. The illustrated system 418 provides fluid flow in the upward direction, although other embodiments may provide the fluid flow in the downward direction. For example, as illustrated by arrows 430, the fluid may enter through the port 428, flow through the lower coolant header 422, distribute through the plurality of coolant tubes 424, flow through the upper coolant header 420, and exit through the port 426. Along this fluid flow path, the fluid absorbs heat from the gasifier to provide active cooling of the gasifier.

The arrangement, geometry, and number of headers 420 and 422 and coolant tubes 424 may vary across different implementations of the active cooling system 418. In the illustrated embodiment, the coolant tubes 424 are of equal diameter, equal length, equal spacing, and vertical orientation relative to the headers 420 and 422. In other embodiments, the active cooling system 418 may include coolant tubes 424 of unequal diameter, unequal length, unequal spacing, and/or other orientations relative to the headers 420 and 422. For example, the coolant tubes 424 may be angled relative to the headers 420 and 422, e.g., between approximately 0 and 90 degrees, 20 to 70 degrees, or 30 to 60 degrees.

Figure 9:
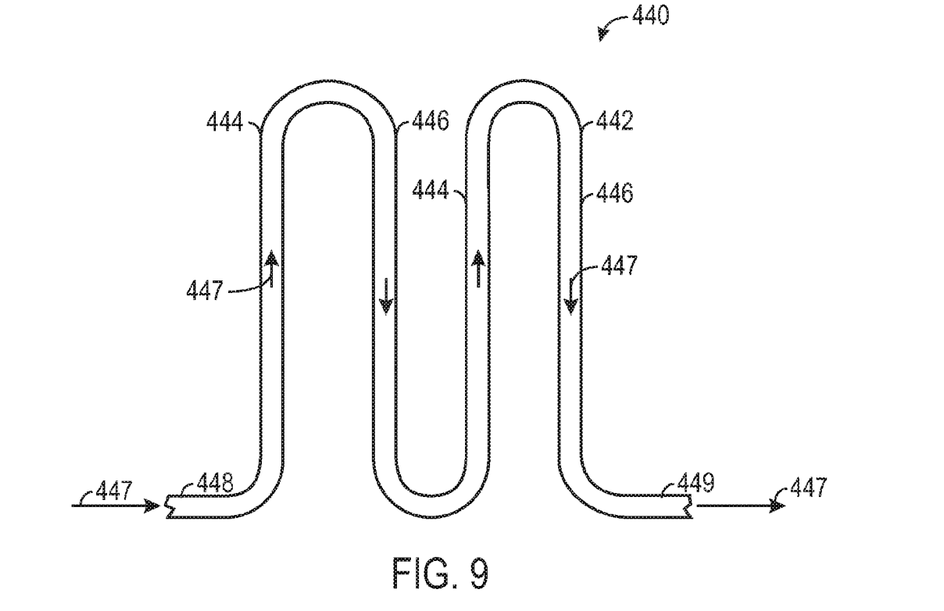
FIG. 9 is a partial schematic side view of an embodiment of an active cooling system, taken within line 8-8 in FIG. 7, using a fuel feedstock as a coolant, illustrating an upwardly and downwardly winding coolant tube.

FIG. 9 is a partial schematic side view of an embodiment of an active cooling system 440, taken within line 8-8 in FIG. 7, using a fuel feedstock as a coolant, illustrating an upwardly and downwardly winding coolant tube 442. In the illustrated embodiment, a single coolant tube 442 continuously winds upward and downward around a circumference of a gasifier (e.g., internal and/or external). In other words, the single coolant tube 442 includes a plurality of upwardly winding tube portions 444 and a plurality of downwardly winding tube portions 446, which alternate with one another about the circumference of the gasifier. Although the illustrated embodiment includes only a single coolant tube 442, other embodiments may include any number of coolant tubes 442 (e.g., 1 to 100) that wind upward and downward about the circumference of the gasifier. Each coolant tube 442 includes an inlet port 448 and an outlet port 449 coupled to a fluid source, such as a fuel feedstock, a non-aqueous fluid, or a combination thereof. As indicated by arrows 447, the fluid flows through the inlet port 448, through the upwardly and downwardly winding tube portions 444 and 446 of the tube 442, and out through the outlet port 449. Along this fluid flow path, the fluid absorbs heat from the gasifier to provide active cooling of the gasifier.

Figure 10:
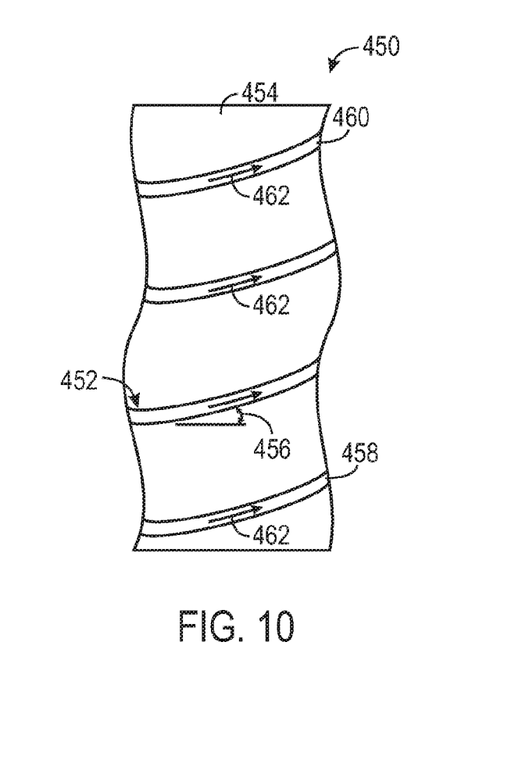
FIG. 10 is a partial schematic side view of an embodiment of an active cooling system, taken within line 8-8 in FIG. 7, using a fuel feedstock as a coolant, illustrating a helically shaped coolant tube.

FIG. 10 is a partial schematic side view of an embodiment of an active cooling system 450, taken within line 8-8 in FIG. 7, using a fuel feedstock as a coolant, illustrating a helically shaped coolant tube 452. In the illustrated embodiment, a single coolant tube 452 winds continuously around a circumference of a gasifier 454 (e.g., internal and/or external) along a spiraling or helical fluid flow path. In other words, the single coolant tube 452 repeatedly encircles the gasifier 454 at an angle 456, e.g., greater than 0 and less than 90 degrees. For example, the angle 456 may range between approximately 1 to 60 degrees, 5 to 45 degrees, or 10 to 30 degrees. Although the illustrated embodiment includes only a single coolant tube 452, other embodiments may include any number of coolant tubes 452 (e.g., 1 to 100) that spiral about the circumference of the gasifier 454. Each coolant tube 452 includes an inlet port 458 and an outlet port 460 coupled to a fluid source, such as a fuel feedstock, a non-aqueous fluid, or a combination thereof. As indicated by arrows 462, the fluid enters through the inlet port 458, flows along the spiraling path of the tube 452, and exits through the outlet port 460. Along this fluid flow path, the fluid absorbs heat from the gasifier 454 to provide active cooling of the gasifier 454.

Technical effects of the invention include active cooling of a gasifier using a fuel and/or a non-aqueous fluid as a coolant. For example, the fuel may flow along one or more paths (e.g., coolant tubes) internal and/or external to the gasifier to absorb heat, and then may subsequently inject into the gasifier to fuel a gasification reaction. In certain embodiments, after absorbing heat from the gasifier, the fuel may flow away from the gasifier and transfer the heat to an external plant component and/or heat exchanger. Similarly, the non-aqueous fluid may flow along one or more paths (e.g., coolant tubes) internal and/or external to the gasifier to absorb heat, and then may subsequently carry the heat away to an external plant component and/or heat exchanger. The active cooling allows a reduced thickness of refractory materials (e.g., bricks) inside gasifier, while also harnessing the heat for use in various processes (e.g., gasification reaction, external plant components, etc.). Use of the fuel as a coolant also may create a layer of slag to mitigate transient heat transfer impacts in a fashion that will self-repair.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A gasification system, comprising:
   a gasifier comprising a gasification region, a gasifier inlet positioned above the gasification region, a gasifier outlet positioned below the gasification region, and an outer wall surrounding the gasification region;
   a first fuel source configured to supply a first fuel to the gasifier while the gasifier is in operation, wherein the first fuel comprises a liquid fuel, a slurry fuel, or a combination thereof; and
   a first fuel path comprising a heat exchanger portion and a fuel injection portion, wherein the heat exchanger portion extends along the outer wall, the heat exchanger portion comprises a heat exchanger inlet and a heat exchanger outlet, the heat exchanger inlet is fluidly coupled to the first fuel source, the heat exchanger outlet is positioned above the heat exchanger inlet, and the fuel injection portion is fluidly coupled to the heat exchanger outlet and to the gasifier inlet;
   wherein the heat exchanger portion is configured to receive the first fuel from the first fuel source at the heat exchanger inlet and to flow the first fuel to the heat exchanger outlet along the outer wall to cool the gasifier while the gasifier is in operation; and
   wherein the fuel injection portion is configured to receive the first fuel from the heat exchanger outlet and to inject the first fuel into the gasifier inlet while the gasifier is in operation.

2. The system of claim 1, wherein the first fuel path comprises a carbonaceous fuel path.

3. The system of claim 1, wherein the gasifier comprises a second fuel path configured to flow a second fuel into the gasification region.

4. The system of claim 3, wherein the first and second fuel paths combine with one another to blend the first and second fuels.

5. The system of claim 3, wherein the first and second fuels are different from one another.

6. The system of claim 5, wherein the second fuel comprises a solid fuel.

7. The system of claim 1, comprising a heat exchanger configured to receive the first fuel from the heat exchanger outlet, to transfer heat from the first fuel to a fluid of an external path, and to deliver the first fuel to the fuel injection portion of the first fuel path.

8. The system of claim 1, comprising an inner wall, wherein the outer wall surrounds the inner wall and the heat exchanger portion of the first fuel path.

9. The system of claim 8, comprising a coolant path extending between the inner wall and the outer wall, wherein the coolant path and the heat exchanger portion of the first fuel path are both configured to cool the gasifier.

10. A gasification system, comprising:
    a gasifier comprising a gasification region, an inner wall surrounding the gasification region, and an outer wall surrounding the inner wall;
    a first fuel source configured to supply a first fuel to the gasifier while the gasifier is in operation; and
    a first fuel path fluidly coupled to the first fuel source, wherein the first fuel path comprises a heat exchanger portion in fluid communication with a fuel injection portion positioned downstream from the heat exchanger portion along a flow direction of the first fuel, the heat exchanger portion extending between the inner wall and the outer wall;
    wherein the heat exchanger portion is configured to receive the first fuel from the first fuel source and to flow the first fuel between the inner wall and the outer wall to cool the gasifier while the gasifier is in operation;
    wherein the fuel injection portion is configured to receive the first fuel from the heat exchanger portion and to inject the first fuel into the gasification region while the gasifier is in operation; and
    a heat exchanger disposed between the heat exchanger portion and the fuel injection portion of the first fuel path, wherein the heat exchanger is configured to receive the first fuel from the heat exchanger portion of the first fuel path, to transfer heat from the first fuel to a fluid of a fluid path external to the gasifier, and to deliver the first fuel to the fuel injection portion of the first fuel path while the gasifier is in operation.

11. The system of claim 10, comprising a plant component having the heat exchanger.

12. The system of claim 10, comprising a boiler having the heat exchanger to boil the fluid.

13. The system of claim 12, wherein the boiler comprises a solvent boiler configured to vaporize a solvent.

14. The system of claim 12, wherein the boiler comprises a steam generator configured to vaporize water into steam.

15. The system of claim 10, wherein the gasifier is configured to inject a second fuel from a second fuel path into the gasification region.

16. The system of claim 10, wherein the heat exchanger portion of the first fuel path comprises a first layer of coolant tubes disposed between the inner wall and the outer wall, and the gasifier comprises a coolant path having a second layer of coolant tubes disposed between the inner wall and the outer wall.

17. A gasification system, comprising:
a gasifier comprising a gasification region and a wall surrounding the gasification region;
a fuel source configured to supply a fuel to the gasifier while the gasifier is in operation; and
a fuel path fluidly coupled to the fuel source, wherein the fuel path comprises a first heat exchanger portion in fluid communication with a fuel injection portion positioned downstream from the first heat exchanger portion along a flow direction of the fuel, the first heat exchanger portion extending along the wall;
wherein the first heat exchanger portion is configured to receive the fuel from the fuel source and to flow the fuel along the wall to cool the gasifier while the gasifier is in operation; and
wherein the fuel injection portion is configured to receive the fuel from the first heat exchanger portion and to inject the fuel into the gasification region while the gasifier is in operation;
a non-aqueous fluid source configured to supply a non-aqueous fluid while the gasifier is in operation;
a non-aqueous fluid path fluidly coupled to the non-aqueous fluid source, wherein the non-aqueous fluid path comprises a second heat exchanger portion extending along the wall;
wherein the second heat exchanger portion is configured to receive the non-aqueous fluid from the non-aqueous fluid source and to flow the non-aqueous fluid along the wall to cool the gasifier while the gasifier is in operation; and
a plant component independent of the gasifier and fluidly coupled to the non-aqueous fluid path, wherein the plant component is configured to receive the non-aqueous fluid from the non-aqueous fluid path while the gasifier is in operation.

18. The system of claim 17, wherein the plant component comprises a heat exchanger configured to transfer heat from the non-aqueous fluid of the non-aqueous fluid path to a fluid of the plant component.

19. The system of claim 17, wherein the plant component comprises a boiler, a steam generator, a distiller, or a combination thereof.

* * * * *